(12) United States Patent
Passerini et al.

(10) Patent No.: US 11,167,354 B2
(45) Date of Patent: Nov. 9, 2021

(54) MACHINE TOOL, IN PARTICULAR LATHE

(71) Applicant: GILDEMEISTER ITALIANA S.P.A., Brembate di Spora (IT)

(72) Inventors: Mirko Passerini, Gaggiano (IT); Valter Ginami, Bergamo (IT)

(73) Assignee: GILDEMEISTER ITALIANA S.P.A., Brembate di Sopra (IT)

( * ) Notice: Subject to any disclaimer, the term of this patent is extended or adjusted under 35 U.S.C. 154(b) by 90 days.

(21) Appl. No.: 16/555,401

(22) Filed: Aug. 29, 2019

(65) Prior Publication Data

US 2020/0070252 A1    Mar. 5, 2020

(30) Foreign Application Priority Data

Aug. 29, 2018   (EP) ..................................... 18191544

(51) Int. Cl.
*B23B 3/30* (2006.01)
*B23Q 39/04* (2006.01)
*B23Q 39/00* (2006.01)

(52) U.S. Cl.
CPC ............... *B23B 3/30* (2013.01); *B23Q 39/04* (2013.01); *B23Q 2039/008* (2013.01)

(58) Field of Classification Search
CPC ......... B23B 29/242; B23B 3/168; B23B 3/30; B23B 3/167; B23Q 1/017; B23Q 1/763; B23Q 2039/008; B23Q 39/04
See application file for complete search history.

(56) References Cited

U.S. PATENT DOCUMENTS

| 3,423,812 A * | 1/1969 | Spur ......................... B23B 3/30 29/38 A |
| 3,643,307 A * | 2/1972 | Ledergerber ............ B23B 3/168 29/38 B |

(Continued)

FOREIGN PATENT DOCUMENTS

| DE | 3913137 A1 * | 11/1989 | ............. B23B 3/168 |
| DE | 19621406 A1 * | 12/1997 | ........... B23Q 39/048 |

(Continued)

OTHER PUBLICATIONS

Jul. 3, 2019 Extended Search Report issued in European Patent Application No. 18191544.8.

*Primary Examiner* — Sara Addisu
(74) *Attorney, Agent, or Firm* — Oliff PLC

(57) ABSTRACT

A machine tool, in particular a lathe, including a machine frame having an upper tool carrier support portion, a lower tool carrier support portion and a spindle carrier portion arranged between the upper and lower tool carrier support portions, a spindle carrier, being arranged on or at a height of the spindle carrier portion of the machine frame, supporting a main spindle configured to receive a workpiece W, the main spindle having a horizontally arranged spindle axis, one or more tool carriers, each tool carrier being supported on a tool carrier assembly being arranged on either the upper tool carrier support portion or the lower tool carrier support portion of the machine frame. Wherein a lower side-surface of the lower tool carrier support portion, to which the one or more tool carriers are mountable, is arranged to have an overhanging inclination.

15 Claims, 11 Drawing Sheets

(56) References Cited

U.S. PATENT DOCUMENTS

| | | | | |
|---|---|---|---|---|
| 4,545,271 | A | * | 10/1985 | Romi .................. B23B 3/06 82/149 |
| 5,078,556 | A | * | 1/1992 | Schrod ................ B23B 5/18 409/132 |
| 5,127,140 | A | | 7/1992 | Oiwa et al. |
| RE34,155 | E | * | 1/1993 | Link .................. B23B 3/168 29/27 A |
| 5,765,456 | A | | 6/1998 | Grossmann |
| 6,128,812 | A | * | 10/2000 | Link .................. B23B 29/242 29/27 C |
| 6,203,478 | B1 | * | 3/2001 | Gorrochategui ...... B23B 39/161 408/236 |
| 2002/0033084 | A1 | * | 3/2002 | Nakaminami .......... B23Q 1/66 82/120 |
| 2010/0251863 | A1 | * | 10/2010 | Sakai ................ B23B 25/06 82/170 |

FOREIGN PATENT DOCUMENTS

| | | | |
|---|---|---|---|
| DE | 10 2015 220 882 A1 | 4/2017 | |
| EP | 0 405 111 A2 | 1/1991 | |
| EP | 0 405 112 A2 | 1/1991 | |
| EP | 0 585 690 A1 | 3/1994 | |
| EP | 0999002 A1 * | 5/2000 | ............ B23B 3/168 |
| EP | 1 027 955 A2 | 8/2000 | |
| EP | 2 714 310 B1 | 7/2016 | |
| EP | 2 714 307 B1 | 1/2017 | |
| EP | 2 714 308 B1 | 1/2017 | |
| EP | 2 714 309 B1 | 1/2017 | |
| JP | 60135102 A * | 7/1985 | ............ B23Q 1/5468 |
| JP | 03131441 A * | 6/1991 | ............ B23Q 1/017 |
| WO | 00/54930 A2 | 9/2000 | |
| WO | 2012/163701 A1 | 12/2012 | |

* cited by examiner

MACHINE TOOL, IN PARTICULAR LATHE

BACKGROUND

Machine tools of a generic type, such as for example a lathe or turret lathe, typically comprises a machine frame that may be provided with at least two rotatably mounted work spindles which face each other and have parallel or coaxial spindle axes, wherein the work spindles can receive workpieces which are machined on the machine tool. In order to provide the tools for machining, tool carriers are supplied which are usually made available on movable tool carrier slides, in particular compound slides, which are arranged at the machine frame and can be moved by means of one or more linear axes relative to the work spindles (e.g. can be moved in three direction such as e.g. the X, Y or Z directions). Such machine tools of this type are known, for example, from EP 2 714 307 B1, EP 2 714 308 B1, EP 2 714 309 B1 or EP 2 714 310 B1.

In general, machine tools of this type require that the machine tool be provided so as to enable efficient machining of the workpieces with the largest possible number of tools usable at the same time, if possible, with the highest possible degree of flexibility as regards the control of the relative movements between the tools and the tools received in the work spindles, accompanied by a simultaneous compact and cost-effective but rigid design of the machine tool, and with a machining area which can be accessed in the best possible way by the processor or operator of the machine tool.

It is an object of the invention to improve a machine tool of the generic type so as to enable more efficient machining of the workpieces with the largest possible number of tools usable at the same time, if possible, with the highest possible degree of flexibility as regards the control of the relative movements between the tools and the tools received in the work spindles, accompanied by a simultaneous compact and cost-effective yet rigid design of the machine tool, and with a machining area which can be accessed in the best possible way by the processor or operator of the machine tool.

SUMMARY

In view of the above object, the present invention proposes a machine tool, in particular a lathe, in accordance with claim 1. Dependent claims relate to preferred exemplary embodiments.

According to an exemplary aspect, a machine tool, in particular a lathe, may comprise a machine frame having an upper tool carrier support portion, a lower tool carrier support portion and a spindle carrier portion arranged between the upper and lower tool carrier support portions, a spindle carrier, being arranged on or at a height of the spindle carrier portion of the machine frame, supporting a main spindle configured to receive a workpiece, the main spindle having a horizontally arranged spindle axis, and one or more tool carriers, each tool carrier being supported on a tool carrier assembly being arranged on either the upper tool carrier support portion or the lower tool carrier support portion of the machine frame.

The tool carriers can be equipped with different types of machining heads, and in particular different types of machining heads (such as e.g. turrets, grinding wheel, gear hobbing devices, etc.) can respectively be mounted onto each tool carrier. There can be one or two tool carriers be supported on the upper tool carrier support portion and/or there can be one or two tool carriers be supported on the lower tool carrier support portion.

A lower side-surface of the lower tool carrier support portion, to which the one or more tool carriers are mountable, is exemplarily arranged to have an overhanging inclination.

Preferably, the lower side-surface of the lower tool carrier support portion is inclined at an overhanging inclination angle in the range between 300 and 330 degrees (or in other words between −60 and −30 degrees), in particular at substantially 315 degrees (or in other words at substantially −45 degrees).

Preferably, an upper side-surface of the upper tool carrier support portion, to which the one or more tool carriers are mountable, is arranged to have an inclination.

Preferably, the upper side-surface of the upper tool carrier support portion is inclined at an inclination angle in the range between 30 and 60 degrees, in particular at substantially 45 degrees.

In preferred exemplary embodiments, the upper side-surface of the upper tool carrier support portion, to which the one or more tool carriers are mountable, is arranged to have an inclination which has substantially the same inclination angle with respect to the horizontal plane from above the horizontal plane as the inclination of the lower side-surface of the lower tool carrier support portion with respect to the horizontal plane from below the horizontal plane. In other words, the absolute value of the (negative) overhanging inclination angle of the lower side-surface of the lower tool carrier support portion is preferably substantial equal to the inclination angle of the upper side-surface of the upper tool carrier support portion. This has the benefit that a complete symmetry of the frame of the machine tool can be realized, for which equal machining performances can be achieved both from upper and lower machining heads (such as turrets, grinding wheel, gear hobbing devices, etc.) arranged on the upper and lower tool carrier supports.

Preferably, the inclination of the upper side-surface of the upper tool carrier support portion and the overhanging inclination of the lower side-surface of the lower tool carrier support portion are arranged at substantially 90 degrees with respect to each other, preferably in that the inclination angle of the upper side-surface of the upper tool carrier support portion is substantially 45 degrees and the inclination angle of the lower side-surface of the lower tool carrier support portion is substantially 315 degrees (or in other words −45 degrees).

Preferably, one or more or each tool carrier assembly is configured to independently move the respective tool carrier in one or more linear directions, including at least one of a Z-axis movement direction for moving the tool carrier horizontally in a direction in parallel to the spindle axis of the main spindle, an X-axis movement direction for moving the tool carrier transverse or perpendicular, in particular preferably radially, to the spindle axis of the main spindle, and a Y-axis movement direction for moving the tool carrier perpendicular or transverse to the X-axis direction and in a direction transverse or perpendicular to the spindle axis of the main spindle.

Preferably, the direction of the X-axis movement direction or the Y-axis movement direction is arranged perpendicular to the spindle axis of the main spindle and parallel to the inclination of the lower side-surface of the lower tool carrier support portion and/or an inclination of an upper side-surface of the upper tool carrier support portion.

Preferably, one or more or each tool carrier assembly is configured to rotate the respective tool carrier about a rotation axis which extends perpendicular to the spindle axis of the main spindle, in particular by a B-axis movement.

Preferably, the rotation axis is arranged transverse or perpendicular to the spindle axis.

Preferably, the machine tool further includes a counter-spindle carrier being arranged on the spindle carrier portion of the machine frame, supporting a counter spindle facing the main spindle and being configured to receive a workpiece, the counter spindle having a horizontally arranged spindle axis being arranged coaxially with the spindle axis of the main spindle.

Preferably, the main spindle carrier and/or the counter-spindle carrier is configured to move along horizontal guides arranged on the spindle carrier portion of the machine frame in a horizontal direction in parallel with the spindle axes of the main and counter spindles.

Preferably, the counter-spindle carrier supports a spindle slide supporting the counter spindle for driving a movement of the counter spindle transverse or perpendicular with respect to the spindle axes.

Preferably, the machine tool further includes an auxiliary spindle carrier being arranged on the spindle carrier portion of the machine frame, supporting a auxiliary hollow spindle being configured to receive and guide a workpiece coaxially with the spindle axis of the main spindle, in particular such that the workpiece extends out of the auxiliary hollow spindle on both sides of the auxiliary spindle carrier, in particular to enable machining of the workpiece clamped by the auxiliary hollow spindle without any release of the clamping state.

It is to be noted that the above aspect can be also provided as an independent aspect for use at machine tools. That is, there can be proposed independently an auxiliary spindle assembly for use at a machine tool, which auxiliary spindle assembly may include an auxiliary spindle carrier configured for being arranged on a spindle carrier portion of a machine frame of the machine tool, the auxiliary spindle carrier supporting an auxiliary hollow spindle being configured to receive and guide a workpiece coaxially with the spindle axis of the main spindle, in particular such that the workpiece extends out of the auxiliary hollow spindle on both sides of the auxiliary spindle carrier, in particular to enable machining of the workpiece clamped by the auxiliary hollow spindle without any release of the clamping state. Such auxiliary spindle may include a spindle drive, such as e.g. a direct drive, for driving a rotation of the received workpiece. There may also be provided, according to an exemplary aspect, a machine tool, in particular a lathe, which may comprise a machine frame, one or more spindles (such as a main spindle and/or a counter-spindle), and an auxiliary spindle assembly, which auxiliary spindle assembly may include an auxiliary spindle carrier arranged on a spindle carrier portion of a machine frame of the machine tool, the auxiliary spindle carrier supporting an auxiliary hollow spindle being configured to receive and guide a workpiece coaxially with the spindle axis of the main spindle, in particular such that the workpiece extends out of the auxiliary hollow spindle on both sides of the auxiliary spindle carrier, in particular to enable machining of the workpiece clamped by the auxiliary hollow spindle without any release of the clamping state.

Preferably, the auxiliary spindle carrier is configured to move along horizontal guides arranged on the spindle carrier portion of the machine frame in a horizontal direction in parallel with the spindle axis of the main spindle.

Preferably, the auxiliary spindle carrier is arranged between the main spindle carrier and the counter spindle carrier.

Preferably, the auxiliary hollow spindle includes an electrically, hydraulically and/or pneumatically controlled clamp unit to clamp the workpiece received in the auxiliary hollow spindle, and a drive to drive a rotational motion of the workpiece clamped by the clamp unit.

Preferably, the auxiliary hollow spindle can clamp the workpiece in one or more clamping states and can also switch to a released state in which the workpiece is freely slidable within the hollow spindle. The clamping states can include a rigid clamping state (locked) and/or a less tightened clamping state in which the workpiece is guided in the hollow spindle but can still be slided in the spindle axis direction.

Preferably, the drive includes an electric or electro-magnetic direct drive mechanism. In other exemplary embodiments, the drive may be realized as a conventional drive mechanism, e.g. including a gear mechanism.

Preferably, in some exemplary embodiments, the auxiliary spindle carrier supports a spindle slide supporting the auxiliary hollow spindle for driving a movement of the auxiliary hollow spindle transverse or perpendicular with respect to the spindle axes.

Preferably, in other exemplary embodiments, the machine tool further includes the auxiliary spindle carrier being arranged on the upper or lower tool carrier portion of the machine frame, supporting the auxiliary hollow spindle being configured to receive and guide a workpiece coaxially with the spindle axis of the main spindle, in particular such that the workpiece extends out of the auxiliary hollow spindle on both sides of the auxiliary spindle carrier, in particular to enable machining of the workpiece clamped by the auxiliary hollow spindle without any release of the clamping state.

Preferably, the auxiliary spindle carrier is configured to move along horizontal guides arranged on the upper or lower tool carrier portion of the machine frame in a horizontal direction in parallel with the spindle axis of the main spindle.

Preferably, also in such exemplary embodiments, the auxiliary spindle carrier is arranged between the main spindle carrier and the counter spindle carrier.

Preferably, also in such exemplary embodiments, the auxiliary spindle carrier supports a spindle slide supporting the auxiliary hollow spindle for driving a movement of the auxiliary hollow spindle transverse or perpendicular with respect to the spindle axes.

In further exemplary embodiments, the machine tool may include two auxiliary hollow spindles, e.g. one being arranged opposed the main spindle and one being arranged opposed the counter spindle, preferably both auxiliary hollow spindles being arranged between the main and counter spindles.

Preferably, both auxiliary hollow spindles are configured to move horizontally in the direction of the spindle axes, and the two auxiliary hollow spindles may each be arranged as discussed above for the case of one auxiliary hollow spindle.

Specifically, the auxiliary spindle carriers may both be arranged on the spindle carrier portion. Also, each of the auxiliary spindle carriers may be arranged on the spindle carrier portion, the upper and/or the lower tool carrier portion. In some exemplary aspects, one auxiliary spindle carrier may be arranged on the upper tool carrier portion and the other auxiliary spindle carrier may be arranged on the lower tool carrier portion. Furthermore, one or both of the auxiliary hollow spindles can be configured to also move in a direction transverse or perpendicular to the spindle axes.

In general, it is to be noted that workpieces can be loaded to the machine tool by a workpiece loading apparatus such as a bar loader, bar feeder, and/or a handling robot. Machined workpieces can be removed by an unloading apparatus, e.g. by a/the handling robot.

While certain exemplary aspects have been described above, it is to be understood that such aspects are merely illustrative of and are not restrictive on the broad invention, and that the exemplary aspects are not limited to the specific constructions and arrangements shown and described above, since various other changes, combinations, omissions, modifications and substitutions, in addition to those set forth in the above paragraphs, are possible. Those skilled in the art will appreciate that various adaptations, modifications, and/or combination of the just described aspects can be configured. Therefore, it is to be understood that, further aspects may be practiced other than as specifically described herein. Those skilled in the art will also appreciate, in view of this disclosure, that different aspects described herein may be combined to form other aspects of the present disclosure.

DETAILED DESCRIPTION

Figure 1:
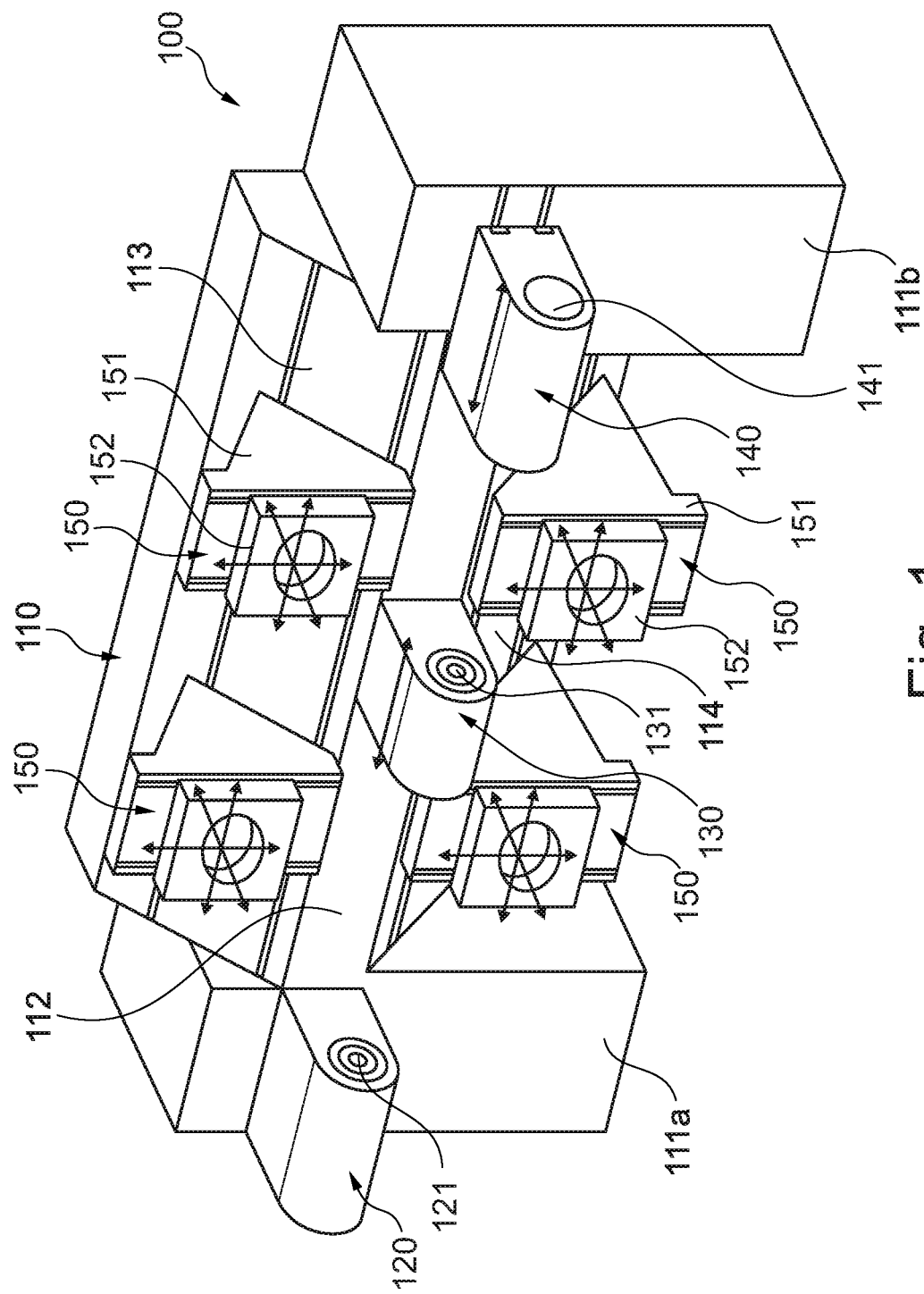
FIG. 1 exemplarily shows a schematic perspective view of a machine tool according to an exemplary embodiment of the present invention.

In the following, preferred aspects and exemplary embodiments will be described in more detail with reference to the accompanying figures. Same or similar features in different drawings and embodiments are referred to by similar reference numerals. It is to be understood that the detailed description below relating to various preferred aspects and preferred embodiments are not to be meant as limiting the scope of the present invention.

FIG. 1 exemplarily shows a schematic perspective view of a machine tool 100 according to an exemplary embodiment of the present invention.

The machine tool 100, exemplarily realized as a turret lathe, comprises a machine frame 110 exemplarily supporting four tool carrier assemblies 150, a workpiece-carrying main spindle 121 supported by a main spindle carrier 120 and a workpiece-carrying counter-spindle 141 supported by a counter-spindle carrier 140.

Figure 2:
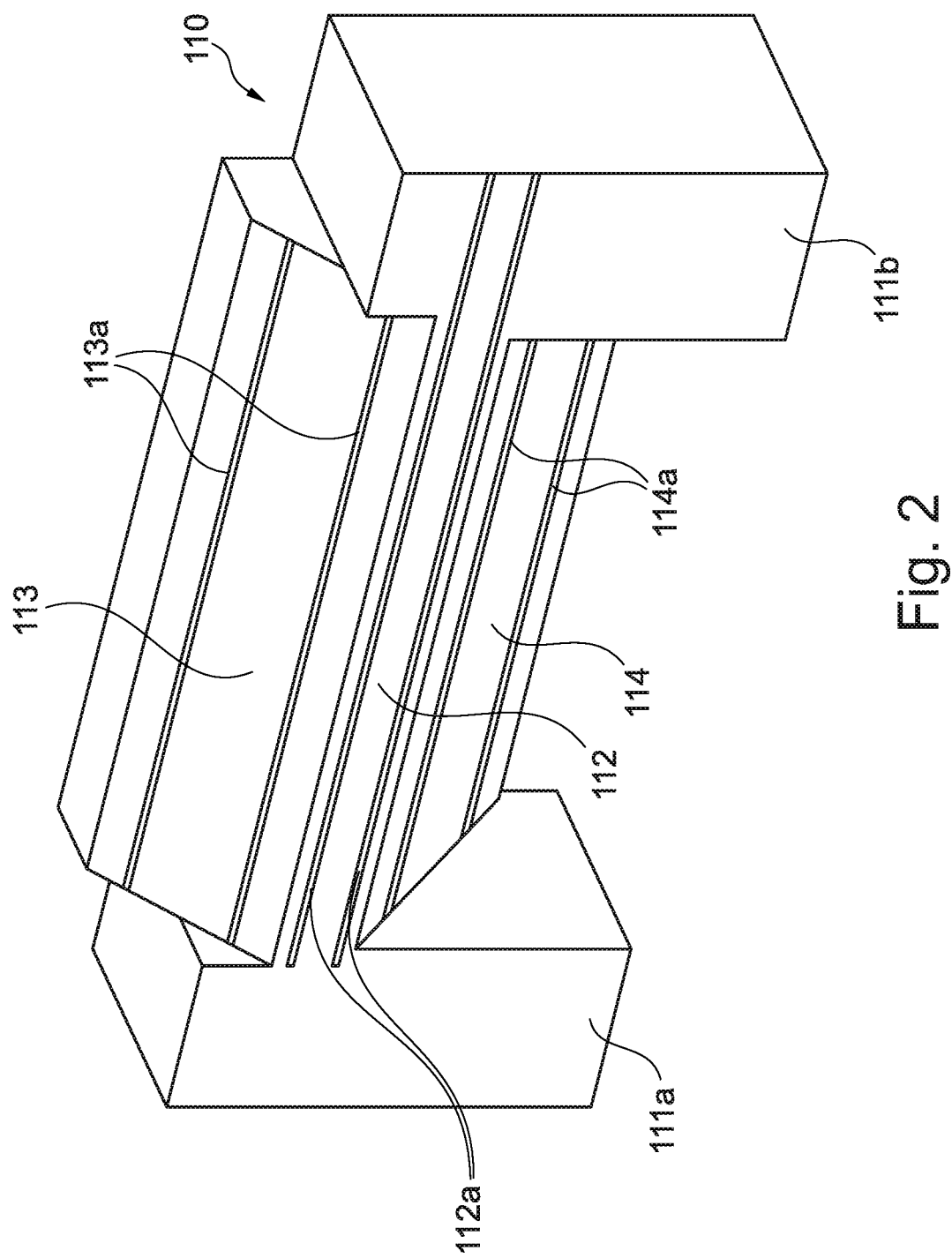
FIG. 2 exemplarily shows a schematic perspective view of a machine frame of the machine tool of FIG. 1.

FIG. 2 exemplarily shows a schematic perspective view of a machine frame 110 of the machine tool 100 of FIG. 1.

The machine frame 110 exemplarily stands on two machine stand portions 111a and 111b, and a carrier support portion of the machine frame 110 is exemplarily formed in between and held by the machine stand portions 111a and 111b.

The machine frame 110 exemplarily has an upper support portion 113 and a lower support portion 114, both of which exemplarily horizontally extend between the two machine stand portions 111a and 111b. A front support portion 112 of the machine frame 110 is formed between the upper support portion 113 and the lower support portion 114, wherein the front support portion 112 extends horizontally extend between the two machine stand portions 111a and 111b.

The front support portion 112 of the machine frame 110 exemplarily has a vertically arranged front surface. The upper side surface of the upper support portion 113 of the machine frame 110 is arranged at an inclined slope, exemplarily at an inclination angle of substantially 45 degrees (e.g. with respect to the work floor on which the machine frame 110 stands with its machine stand portions 111a and 111b). The lower side surface of the lower support portion 114 of the machine frame 110 is arranged at an overhanging inclined slope, exemplarily at an inclination angle of substantially 315 degrees (e.g. with respect to the work floor on which the machine frame 110 stands with its machine stand portions 111a and 111b).

In other exemplary embodiments, the inclination angle of the upper side surface of the upper support portion 113 of the machine frame 110 may be in the range of 30 to 60 degrees. Also, the inclination angle of the lower side surface of the lower support portion 114 of the machine frame 110 may be in the range of 300 to 330 degrees. Specifically, it may be preferably provided that the angle formed between the upper and lower support portions 113 and 114 is substantially 90 degrees.

For slidably supporting tool carrier assemblies 150 on the upper side of the machine frame 110 in a machining area between the spindles, the upper support portion 113 of the machine frame 110 has horizontally extending guides 113a. For slidably supporting tool carrier assemblies 150 on the lower side of the machine frame 110 in a machining area between the spindles, the lower support portion 114 of the machine frame 110 has horizontally extending guides 114a. For slidably supporting the counter spindle carrier 140 and the auxiliary spindle carrier 130, the front-side oriented front support portion 112 of the machine frame 110 has horizontally extending guides 112a.

Figure 3:
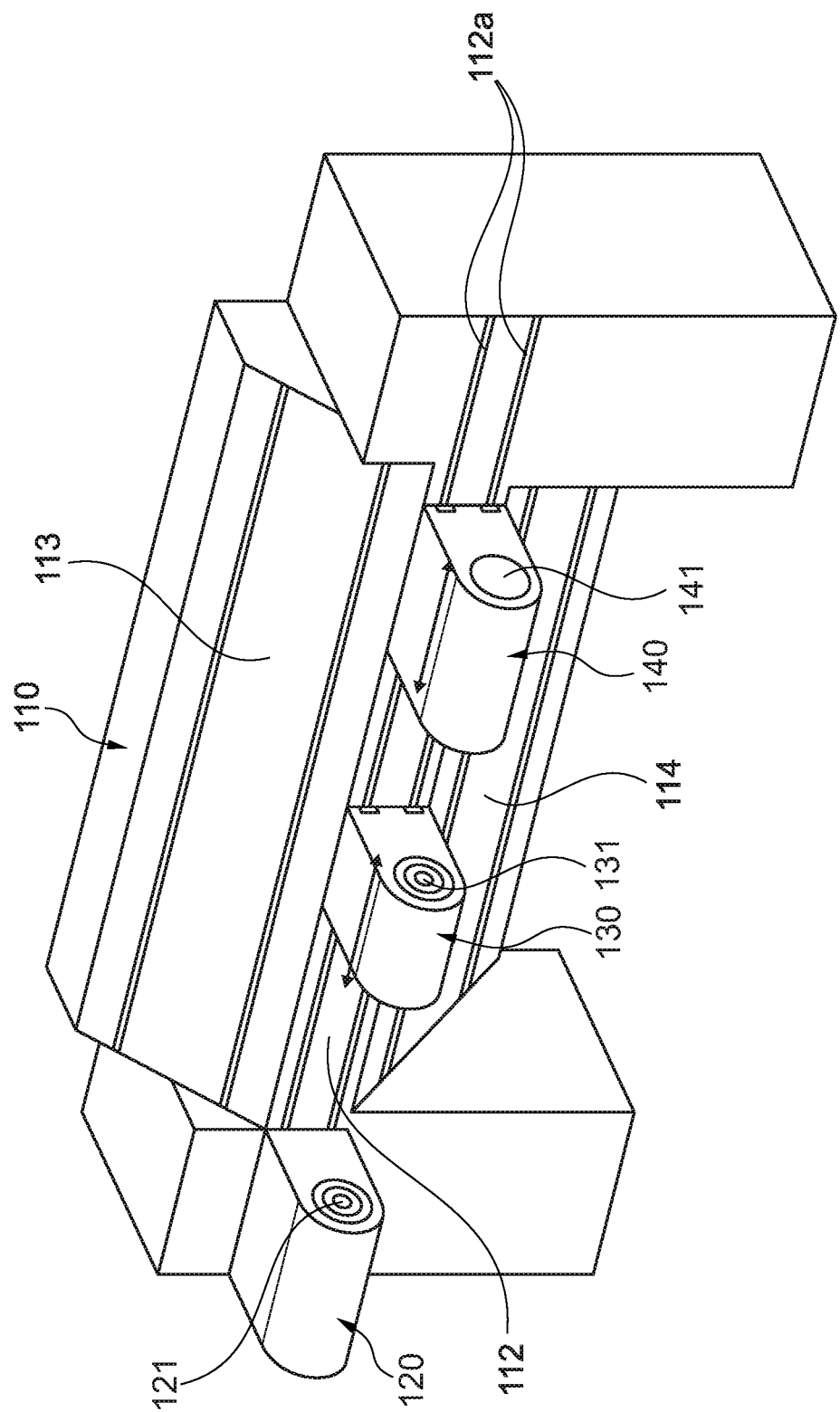
FIG. 3 exemplarily shows a schematic perspective view of the machine frame of FIG. 2 with mounted workpiece spindles.

FIG. 3 exemplarily shows a schematic perspective view of the machine frame 100 of FIG. 2 with mounted workpiece spindles.

Exemplarily on the left front side on a front surface side of the machine stand portion 111a and exemplarily at the height of the front support portion 112, the machine frame 110 carries the main spindle carrier 120, exemplarily guided horizontally on the guides 112a on the front support portion 112. The main spindle carrier 120 includes the workpiece-carrying main spindle 121 being configured to receive an elongated workpiece, such as a bar, and drive a rotation of the received workpiece around the spindle axis of the main spindle 121. Exemplarily, the main spindle 121 is arranged with its spindle axis extending in the horizontal direction.

Further exemplarily, the counter-spindle carrier 140 is slidably mounted to the front support portion 112 on the guides 112a. The machine frame 110 carries the counter-spindle carrier 140 which includes the workpiece-carrying counter spindle 141 being configured to receive an elongated workpiece, such as a bar, and drive a rotation of the received workpiece around the spindle axis of the counter spindle 141. Exemplarily, the counter spindle 141 is arranged with its spindle axis extending in the horizontal direction.

Specifically, the counter spindle 141 is exemplarily arranged opposing the main spindle 121 with its spindle axis extending in the horizontal direction coaxially arranged with respect to the spindle axis of the main spindle 121. Accordingly, the counter spindle 141 can be moved horizontally towards the main spindle 121 to receive the workpiece received in the main spindle 121 to take over the workpiece from the main spindle 121, e.g. for allowing to machine the rear ends of the workpiece.

Further exemplarily, an optional auxiliary spindle carrier 130 is slidably mounted to the front support portion 112 between the main spindle carrier 120 and the counter-spindle carrier 140, exemplarily guided horizontally on the guides 112a on the front support portion 112, i.e. exemplarily on the same guides 112a which support the counter spindle carried 130.

The machine frame 110 carries the optional auxiliary spindle carrier 130 which includes (or at least supports) a auxiliary hollow spindle 131 being configured to receive an elongated workpiece, such as a bar, and support and/or guide a rotation of the received workpiece around the guide rotation axis of the auxiliary hollow spindle 131. Exemplarily, the auxiliary hollow spindle 131 is arranged with its guide rotation axis (auxiliary spindle axis) extending in the horizontal direction. The auxiliary hollow spindle 131 can act as a spindle that clamps/holds a workpiece and drives rotation of the workpiece, and the auxiliary hollow spindle 131 can also act as a rotary guide bush that guides rotation of a workpiece clamped in one of or both of the main and counter spindles.

Specifically, the optional auxiliary hollow spindle 131 is exemplarily arranged between the main spindle 121 and the counter spindle 141, on guides 12a, with its guide rotation axis extending in the horizontal direction coaxially arranged with respect to the spindle axes of the main spindle 121 and the counter spindle 141.

Accordingly, the auxiliary hollow spindle 131 can be moved horizontally in the range in between the main spindle 121 and the counter spindle 141 to receive the workpiece received in the main spindle 121 and to guide and/or support it, e.g. to prevent bending of the workpiece due to a force applied by the tool or to receive the workpiece received in the counter spindle 141 and to guide and/or support it, e.g. to prevent bending of the workpiece due to a force applied by the tool.

Returning again to FIG. 1, it is exemplarily shown that four workpiece carrier assemblies 150 are arranged on the upper and lower support portions of the machine frame 110 in a machining area between the spindles 121 and 141. Specifically, two workpiece carrier assemblies 150 are exemplarily slidably arranged on the upper support portion 113 of the machine frame 110, on the guides 113a, and two workpiece carrier assemblies 150 are exemplarily slidably arranged on the lower support portion 114 of the machine frame 110, on the guides 114a.

It is to be noted that the number of tool assembly carriers 150 can be changed, and other configurations can be provided. The embodiment with four tool assemblies carriers 150, two upper ones and two lower ones, gives high machining flexibilities for simultaneous machining of different workpieces or the same workpiece at different portions, and also to provide many tool types.

However, it is possible to also provide less than four tool assemblies carriers 150, for example: only one upper tool assembly carrier, two upper tool assembly carriers, only one lower tool assembly carrier, two lower tool assembly carriers, one upper tool assembly carrier and one lower tool assembly carrier, one upper tool assembly carrier and two lower tool assembly carriers, or two upper tool assembly carriers and one lower tool assembly carrier. For example, the tool assembly carriers can be mounted according to the machining process requirements, e.g. based on customer's preferences and requirements.

Each tool assembly carrier 150 can be slidably mounted to be horizontally moveable along the guides 113a or 114a of the respective one of the upper and lower support portions 113 or 114. Such movement direction is typically referred to as Z-direction, and each tool assembly carrier 150 may be movable via a respective numerically controllable Z-axis.

In addition, the tool carrier assemblies 150 are exemplarily configured to carry tool mounts with one or more tools for machining of workpieces received at any of the spindles 131 or 141, and the tool carrier assemblies 150 are further exemplarily configured with two further linear axes, including a vertical axis such to vertically move the tool mounts (i.e. perpendicular to the direction of the coaxially arranged spindle axes). Such vertical movement direction is typically referred to as X-direction, and each tool assembly carrier 150 may be movable via a respective numerically controllable X-axis.

Another third linear axis movement may be provided, for each tool carrier assembly 150, as another horizontal or inclined axis such to move the tool mounts in a third direction, which is exemplarily arranged perpendicular to the direction of the coaxially arranged spindle axes and which is horizontally oriented or inclined to the horizontal plane. In any case, such further linear axis movement direction is preferably arranged perpendicular or transverse with respect to the vertical axis movement direction. Such third movement direction, horizontally arranged or inclined, is typically referred to as Y-direction, and each tool assembly carrier 150 may be movable via a respective numerically controllable Y-axis.

Figure 4:
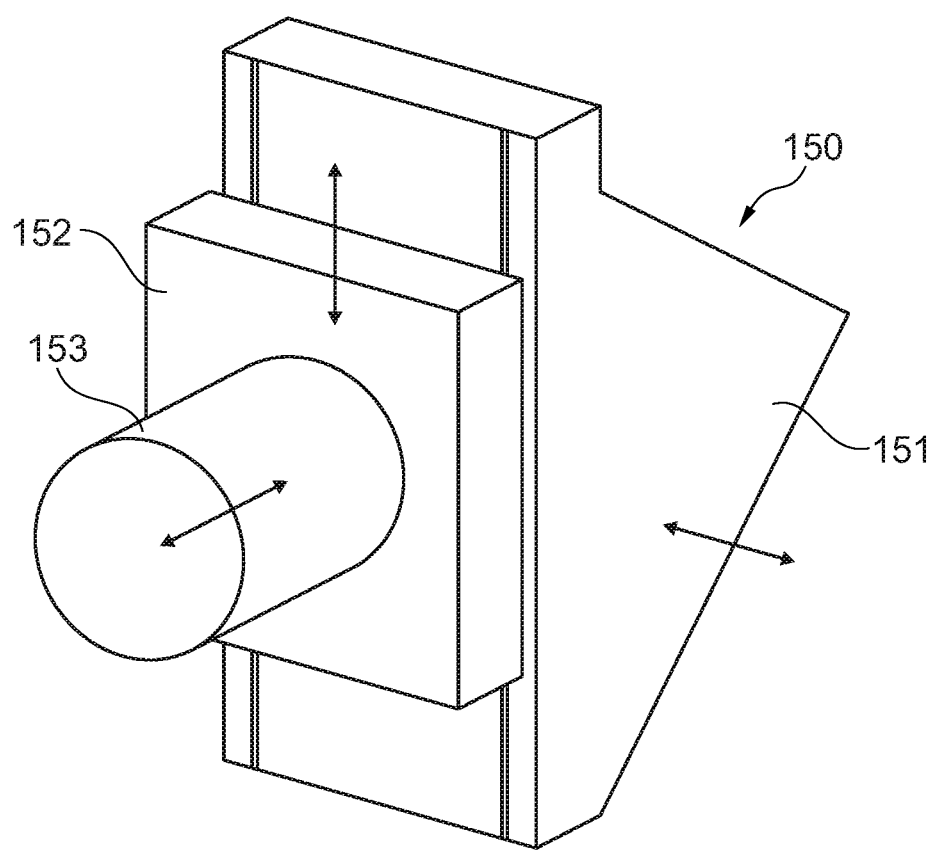
FIG. 4 exemplarily shows a schematic perspective view of a tool carrier assembly according to exemplary embodiments.

FIG. 4 exemplarily shows a schematic perspective view of a tool carrier assembly 150 according to exemplary embodiments. Exemplarily, all one, two three or four tool carrier assemblies 150 arranged on the machine frame 110 of the machine tool 100 may be realized similarly.

The tool carrier assembly 150 includes a carrier support slide 151 which is configured to be slidably mounted to the guides 113a or 114a of the upper and lower support portions 113 or 114 of the machine frame 110. Accordingly, when mounted on top of the upper support portion 113 on the guides 113a, the carrier support slide 151 is configured to be moved horizontally on and along the guides 113a (Z-axis) in the horizontal direction in parallel to the horizontally and coaxially arranged spindle axes of the spindles 121 and 141. On the other hand when mounted in a hanging state at the overhanging lower support portion 114 at the guides 114a, the carrier support slide 151 is configured to be moved horizontally along the guides 114a (Z-axis) in the horizontal direction in parallel to the horizontally and coaxially arranged spindle axes of the spindles 121 and 141.

On the front side of the carrier support slide 151 of the tool carrier assembly 150, facing the machining area of the machine tool 100 in between the spindles 121 and 141, a tool carrier support slide 152 is slidably mounted to the carrier support slide 151. The tool carrier support slide 152 is configured to be moved vertically on and along vertical guides arranged on a front face of the carrier support slide 151 (X-axis) in the vertical direction.

On the front side of the tool carrier support slide 152 of the tool carrier assembly 150, facing the machining area of the machine tool 100 in between the spindles 121 and 141, a horizontally arranged tool carrier quill 153 (not shown in FIG. 1) exemplarily extending from the front side of the tool carrier support slide 152 vertically into the machining area of the machine tool 100 is exemplarily provided to mount a tool carrier at the front-side end portion of the tool carrier quill 153.

In exemplary embodiments, optionally, the tool carrier quill 153 can be mounted to the tool carrier support slide 152 so as to controllably move horizontally in a Y-direction (preferably perpendicular to the direction of the spindle axes of the spindles 121 and 141) towards the front of the machine tool 100 (Y-axis). In other exemplary embodiments, the tool carrier quill 153 can include an element configured to be moveable horizontally in the Y-direction (preferably perpendicular to the direction of the spindle axes of the spindles 121 and 141) towards the front of the machine tool 100 (Y-axis).

By the above arrangement as shown in FIGS. 1 and 4, the tool carrier assembly 150 is configured to carry a tool carrier, e.g. a tool holder holding one or more tools, and is further configured to controllably move the tool carrier in three independent movement directions, including the X-direction exemplarily extending vertically and perpendicular to the horizontally arranged direction of the spindle axes, the Y-direction exemplarily extending horizontally and perpendicular to the horizontally arranged direction of the spindle axes, and the Z-direction exemplarily extending horizontally and in parallel with the horizontally arranged direction of the spindle axes. Accordingly, the tool carrier assembly 150 is exemplarily configured to be equipped with three independent controllable linear axes: an X-axis, a Y-axis and a Z-axis.

Furthermore, optionally, the tool carrier quill 153 may be configured to further include a rotatably driven B-axis so as to control a rotational movement of the tool carrier mounted to the tool carrier assembly 150 around the horizontally arranged longitudinal axis of the tool carrier quill 153, i.e. about a rotational axis extending in the X-direction.

Figure 5:
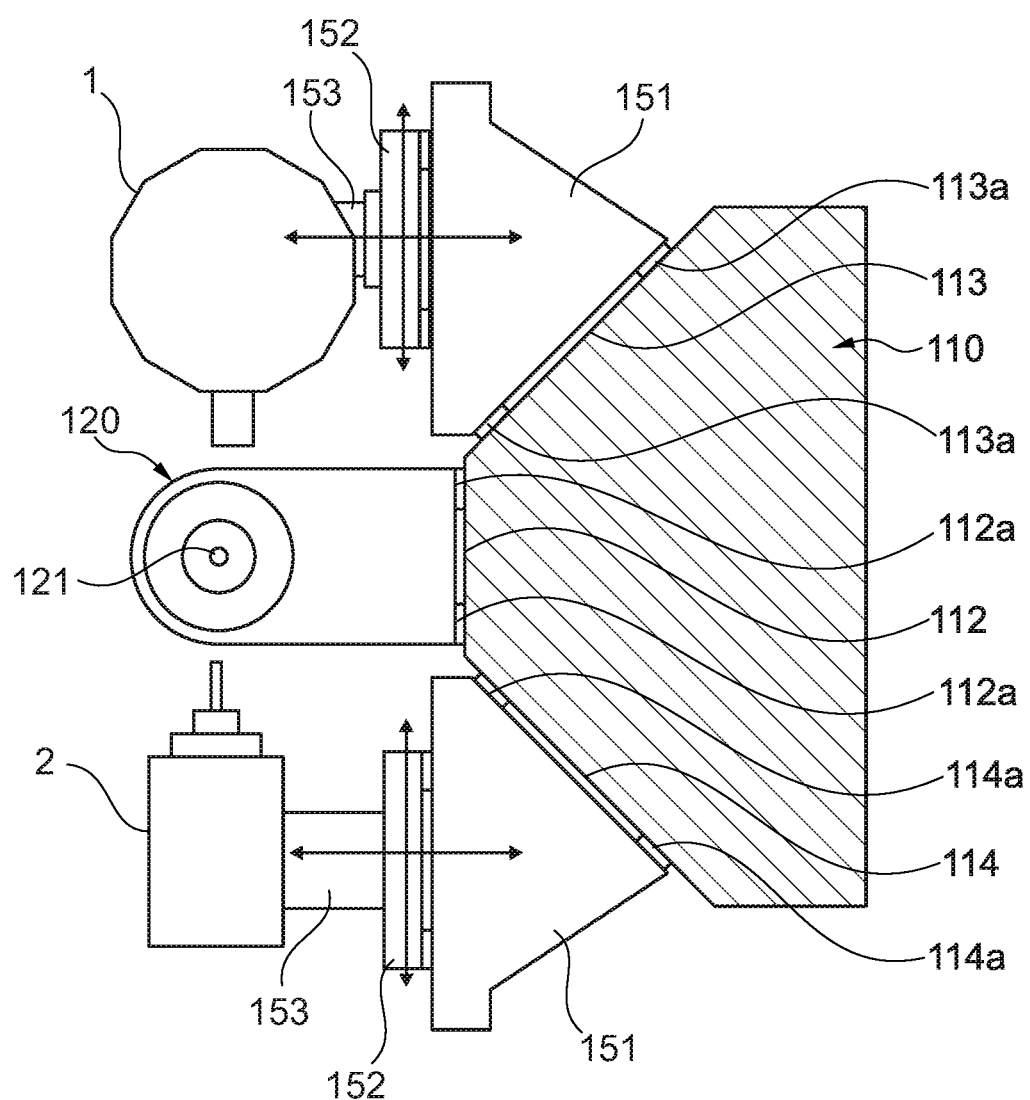
FIG. 5 exemplarily shows a schematic a cross-sectional view through the machine frame of the machine tool of FIG. 1.

FIG. 5 exemplarily shows a schematic a cross-sectional view through the machine frame 110 of the machine tool 100 of FIG. 1. The cross-sectional shape of the machine frame 110 of the machine tool 100 exemplarily includes an isosceles equiangular trapezoidal shape, which is rotated by 90 degrees. In other embodiments, the shape may be different and the rotation angle may be different.

FIG. 5 shows that the front support portion 112 of the machine frame 110 exemplarily has the vertically arranged front surface. The spindle carrier case 120 is mounted to the front-side of the machine tool 100 at the height of the front support portion 112. The front support portion 112 further supports the horizontally extending guides 112a on which the counter spindle carrier 140 and/or the auxiliary spindle carrier 130 can be slidably mounted (not shown in FIG. 5).

As previously mentioned, the upper side surface of the upper support portion 113 of the machine frame 110 is arranged at the inclined slope, exemplarily at an inclination angle of substantially 45 degrees (e.g. with respect to the work floor on which the machine frame 110 stands with its machine stand portions 111a and 111b). As previously mentioned, in other exemplary embodiments, the inclination angle of the upper side surface of the upper support portion 113 of the machine frame 110 may be in the range of 30 to 60 degrees.

For slidably supporting tool carrier assemblies 150 on the upper side of the machine frame 110 in a machining area between the spindles, the upper support portion 113 of the machine frame 110 has the horizontally extending guides 113a on which the upper tool carrier assembly 150 is mounted. The upper tool carrier assembly 150 can be moved horizontally (Z-axis) and in parallel with the direction of the spindle axes (i.e. perpendicular to the drawing plane of FIG. 5).

The lower side surface of the lower support portion 114 of the machine frame 110 is arranged at the overhanging inclined slope, exemplarily at an inclination angle of substantially 315 degrees (e.g. with respect to the work floor on which the machine frame 110 stands with its machine stand portions 111a and 111b). Also, the inclination angle of the lower side surface of the lower support portion 114 of the machine frame 110 may be in the range of 300 to 330 degrees. Specifically, it may be preferably provided that the angle formed between the upper and lower support portions 113 and 114 is substantially 90 degrees.

For slidably holding tool carrier assemblies 150 at the lower side of the machine frame 110 in a machining area between the spindles in a hanging state, the lower support portion 114 of the machine frame 110 has the horizontally extending guides 114a on which the lower tool carrier assembly 150 is mounted in a hanging state. The lower tool carrier assembly 150 can be moved horizontally (Z-axis) and in parallel with the direction of the spindle axes (i.e. perpendicular to the drawing plane of FIG. 5).

As can be seen in FIG. 5, an advantage of the lower side surface of the lower support portion 114 of the machine frame 110 being arranged at the overhanging inclined slope, to support and hold the lower tool carrier assembly 150 in the hanging state, is that the slides and support structures of the lower tool carrier assembly 150 can hide under the overhanging lower support portion 114 so as to not extend into the machining area under the spindles so that chip fall from workpieces during machining can fall down without being obstructed by the support structures of the lower tool carrier assembly 150.

Exemplarily, in FIG. 5, the upper tool carrier assembly 150 carries a tool turret 1 and the lower tool carrier assembly 150 carries a machining head 2 holding and driving a tool such as a grinding tool or a milling tool.

Figure 6:
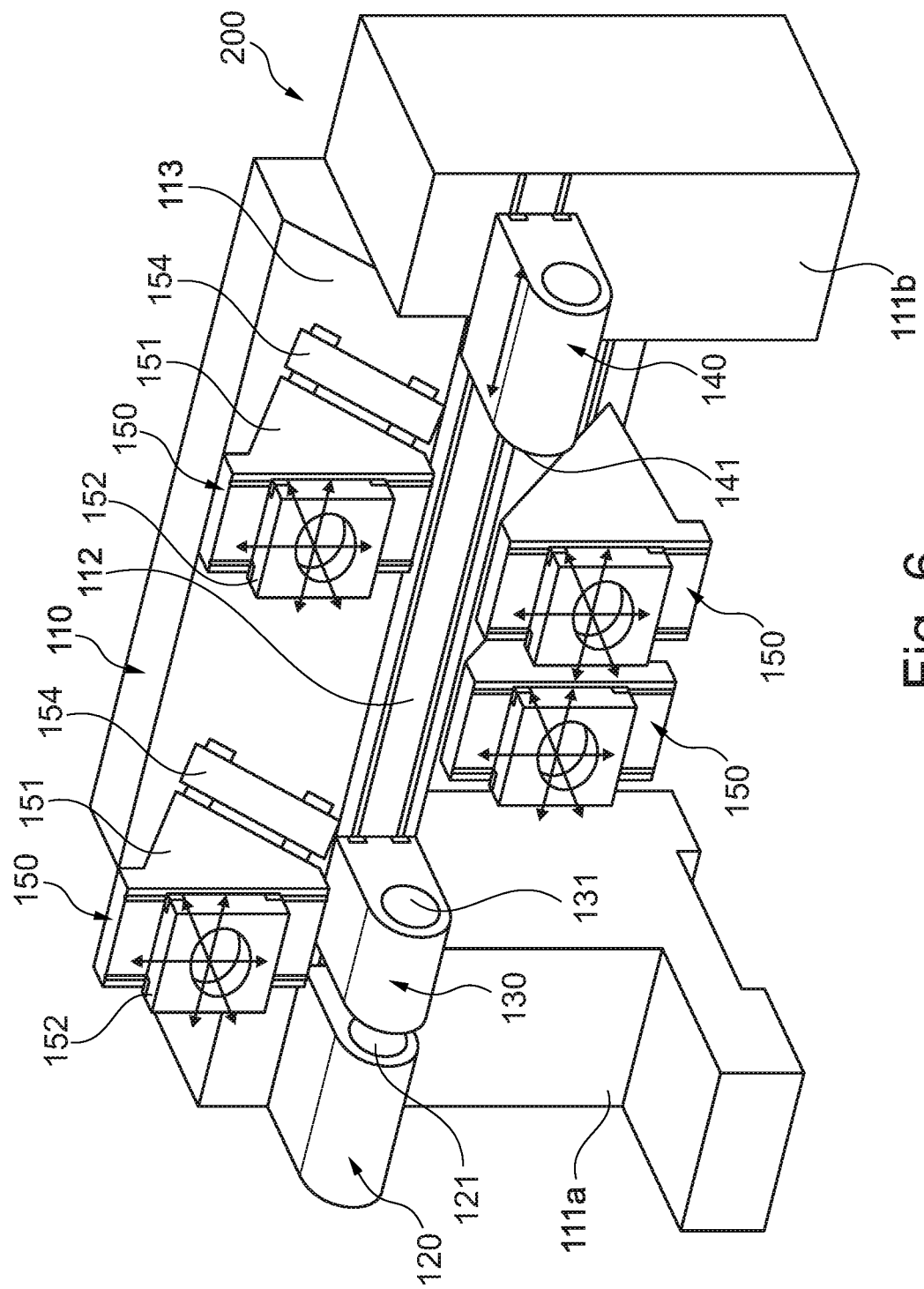
FIG. 6 exemplarily shows a schematic perspective view of a machine tool according to another exemplary embodiment of the present invention.
Figure 7:
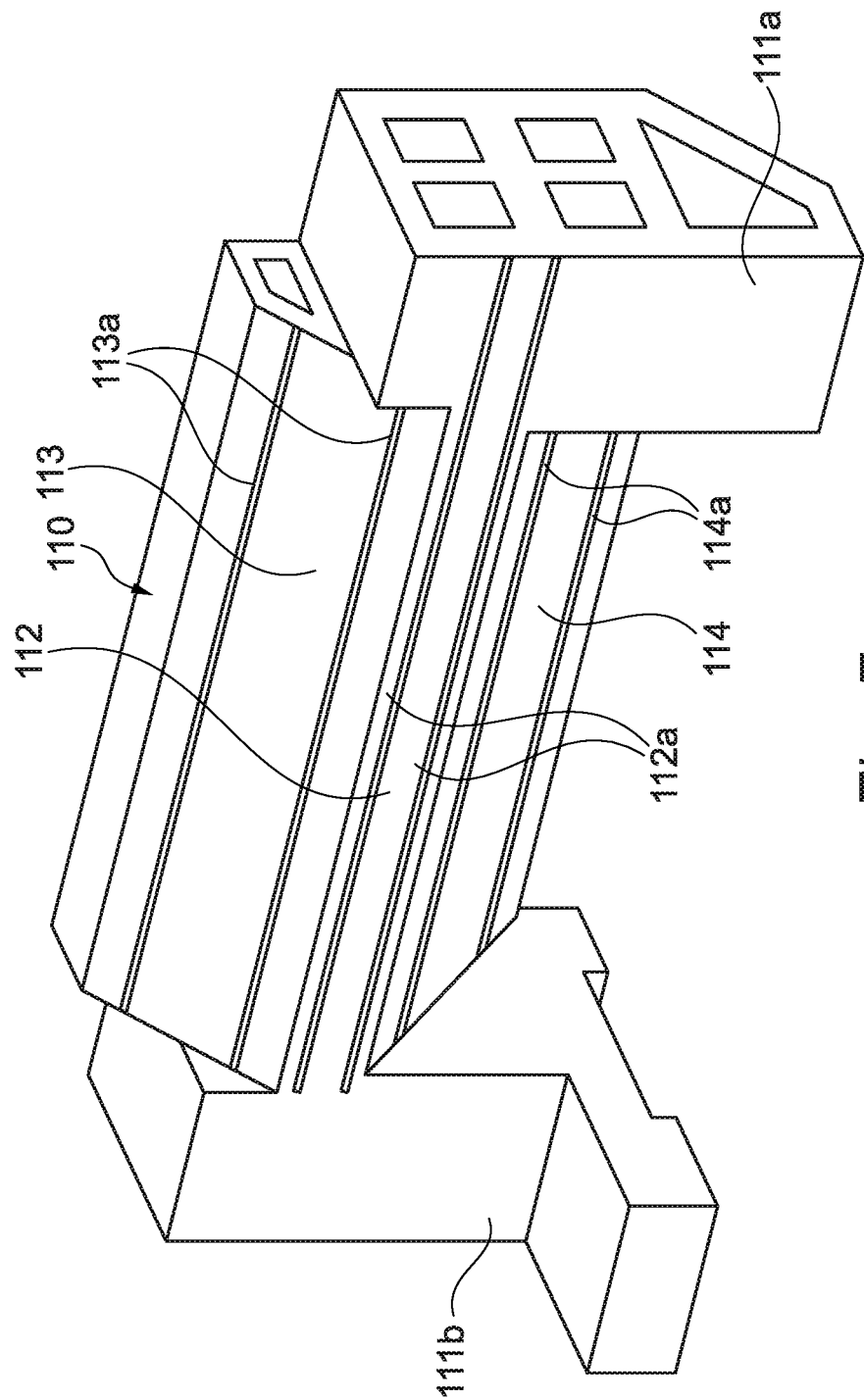
FIG. 7 exemplarily shows a schematic perspective view of a machine frame of the machine tool of FIG. 6.

FIG. 6 exemplarily shows a schematic perspective view of a machine tool 200 according to another exemplary embodiment of the present invention. FIG. 7 exemplarily shows a schematic perspective view of a machine frame 110 of the machine tool 200 of FIG. 6.

The machine tool 200 is different compared to the machine tool 100 above by a different configuration of the tool carrier assemblies 150. The description will focus on differences in comparison to the machine tool 100 above, and non-described aspects are or may be realized similarly.

Again, the machine frame 110 exemplarily stands on two machine stand portions 111a and 111b, and a carrier support portion of the machine frame 110 is exemplarily formed in between and held by the machine stand portions 111a and 111b. The machine frame 110 exemplarily has an upper support portion 113 and a lower support portion 114, both of which exemplarily extend between the two machine stand portions 111a and 111b. A front support portion 112 of the machine frame 110 is formed between the upper support portion 113 and the lower support portion 114, wherein the front support portion 112 extends horizontally extend between the two machine stand portions 111a and 111b.

The front support portion 112 of the machine frame 110 exemplarily has a vertically arranged front surface. The upper side surface of the upper support portion 113 of the machine frame 110 is arranged at an inclined slope, exemplarily at an inclination angle of substantially 45 degrees (e.g. with respect to the work floor on which the machine frame 110 stands with its machine stand portions 111a and 111b). The lower side surface of the lower support portion 114 of the machine frame 110 is arranged at an overhanging inclined slope, exemplarily at an inclination angle of substantially 315 degrees (e.g. with respect to the work floor on which the machine frame 110 stands with its machine stand portions 111a and 111b).

For slidably supporting tool carrier assemblies 150 on the upper side of the machine frame 110 in a machining area between the spindles, the upper support portion 113 of the machine frame 110 has horizontally extending guides 113a. For slidably supporting tool carrier assemblies 150 on the lower side of the machine frame 110 in a machining area between the spindles, the lower support portion 114 of the machine frame 110 has horizontally extending guides 114a. For slidably supporting the counter spindle carrier 140 and the auxiliary spindle carrier 130, the front-side oriented front support portion 112 of the machine frame 110 has horizontally extending guides 112a.

Different from the machine tool 100 of FIG. 1 above, the tool carrier assemblies 150 are further equipped with another carrier support slide 154 which is mounted to slide horizontally on the guides 113a or guides 114a on the upper or lower support portions 113 and 114. On the other hand the carrier support slide 151 is slidably mounted on the carrier support slide 154 to be movable, as a modified X-axis, on guides on the carrier support slide 154 in a direction perpendicular to the direction of the spindle axes.

Figure 8:
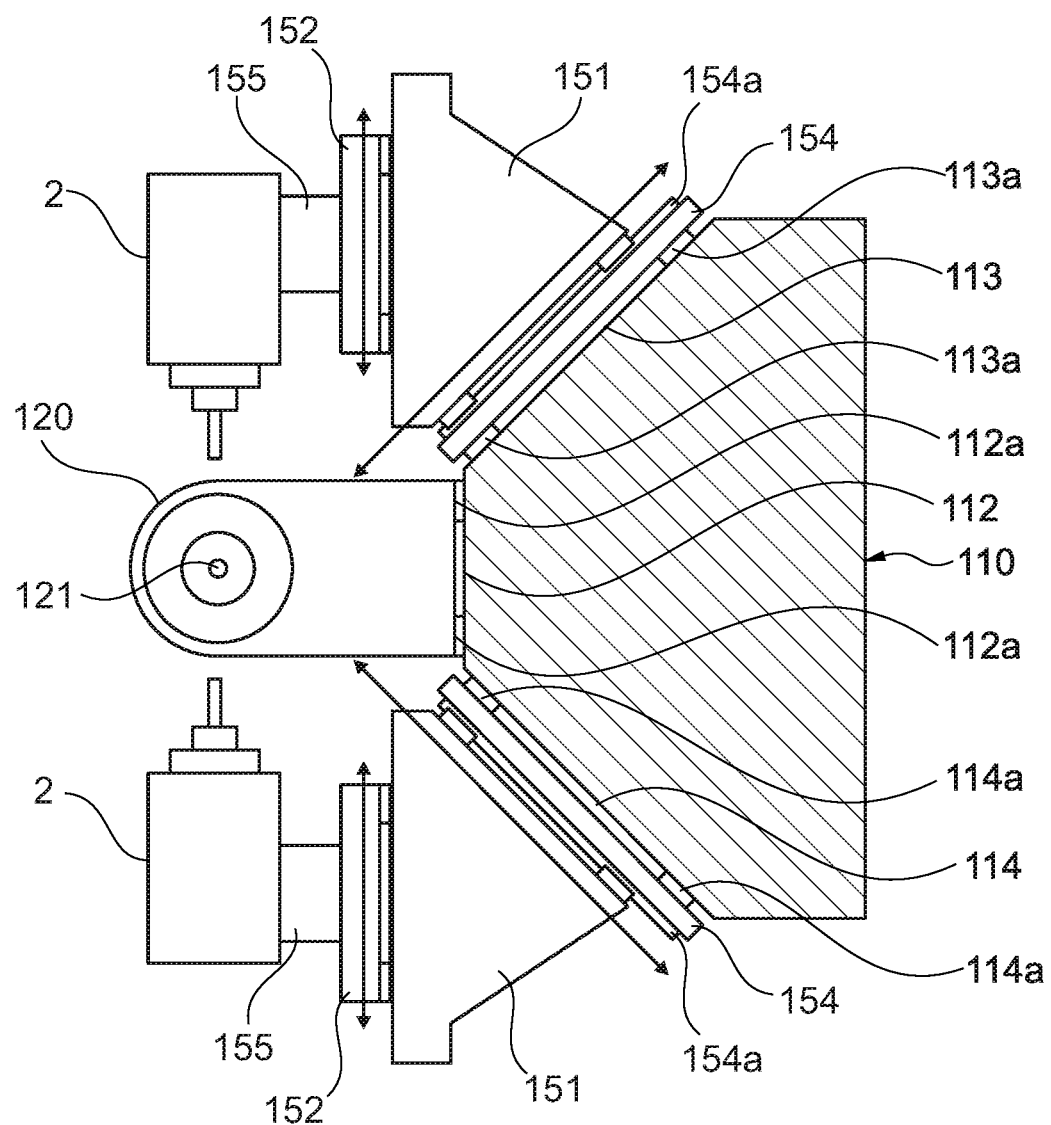
FIG. 8 exemplarily shows a schematic a cross-sectional view through the machine frame of the machine tool of FIG. 6.

FIG. 8 exemplarily shows a schematic a cross-sectional view through the machine frame 110 of the machine tool 200 of FIG. 6.

Exemplarily, due to the modified Y-axis, the tool carrier quill 155 mounted on the frontside of the tool carrier slide 152 is a fixed structure not providing an additional linear movement. Still, optionally, the tool carrier quill 155 can include a B-axis to drive a rotation of the tool carrier, exemplarily embodied as machining heads 2 in FIG. 8, about a rotation axis which extends towards the machining area horizontally and perpendicular to the direction of the spindle axes.

FIG. 8 exemplarily shows that the directions of the modified Y-axis of the slidable movement of the carrier support slides 151 on the carrier support slides 155 are exemplarily extending in parallel to the respective inclinations of the upper and lower support portions 113 and 114.

Figure 9:
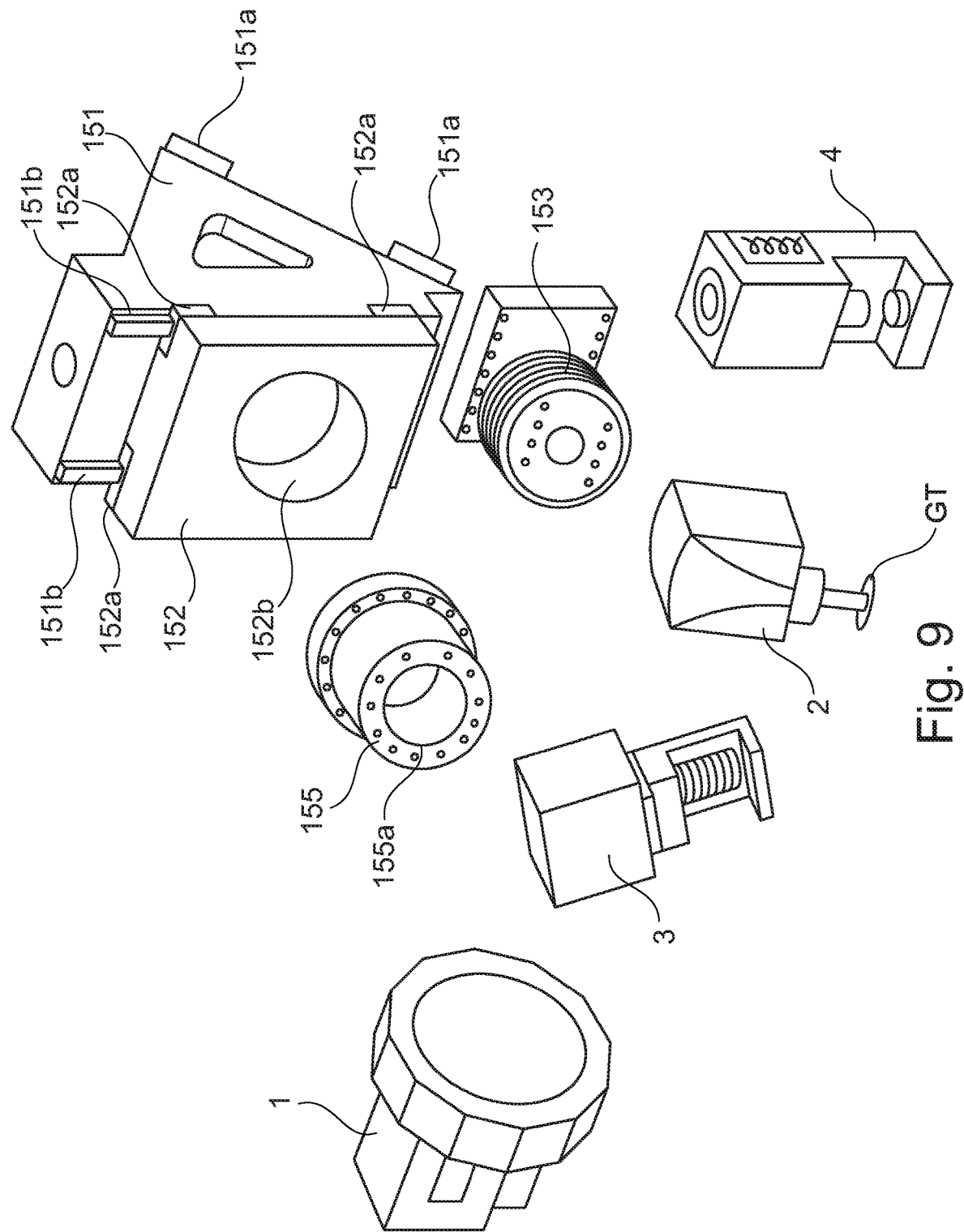
FIG. 9 exemplarily shows a schematic perspective view of modules of a modular tool carrier assembly system according to exemplary embodiments.

FIG. 9 exemplarily shows a schematic perspective view of modules of a modular tool carrier assembly system according to exemplary embodiments.

The tool carrier assembly system includes the slide compound module including the carrier support slide 151 and the tool carrier support slide 152 mounted on a front side of the carrier support slide 151 with guide slides 152a mounted slidably to the vertically extending guides 151b arranged on the front-side face of the carrier support slide 151. The lower-side face of the carrier support slide 151 has guide slides 151a which can be configured to be slidably mounted to the guides 113a or 114a on the upper or lower support portions 113 and 114 or to the guides 154a (see FIG. 8) on the other carrier support slide 154.

The tool carrier support slide 152 exemplarily has a cylindrical through hole 152 to which tool carrier modules such as a fixed quill 155 or an optional B-axis quill 153 can be mounted. The fixed quill 155 can be modified to further include a B-axis and/or a slidable element to provide a Y-axis. According to different quill modules, it is possible to equip the tool carrier assembly a fixed quill, a quill equipped with an included Z-axis, a quill equipped which an included a B-axis and a quill equipped which an included a B-axis and an included Z-axis.

Furthermore, the tool carrier assembly system includes different tool carrier modules so that the tool carrier assembly can be equipped with different tool carriers such as with a tool turret 1, a machining head 2 adapted to hold and drive a tool such as a milling tool or a grinding tool GT (as exemplarily shown in FIG. 9), a gear hobbing tool unit 3 or also a steady rest 4 or also a forming tool, or others.

Figure 10:
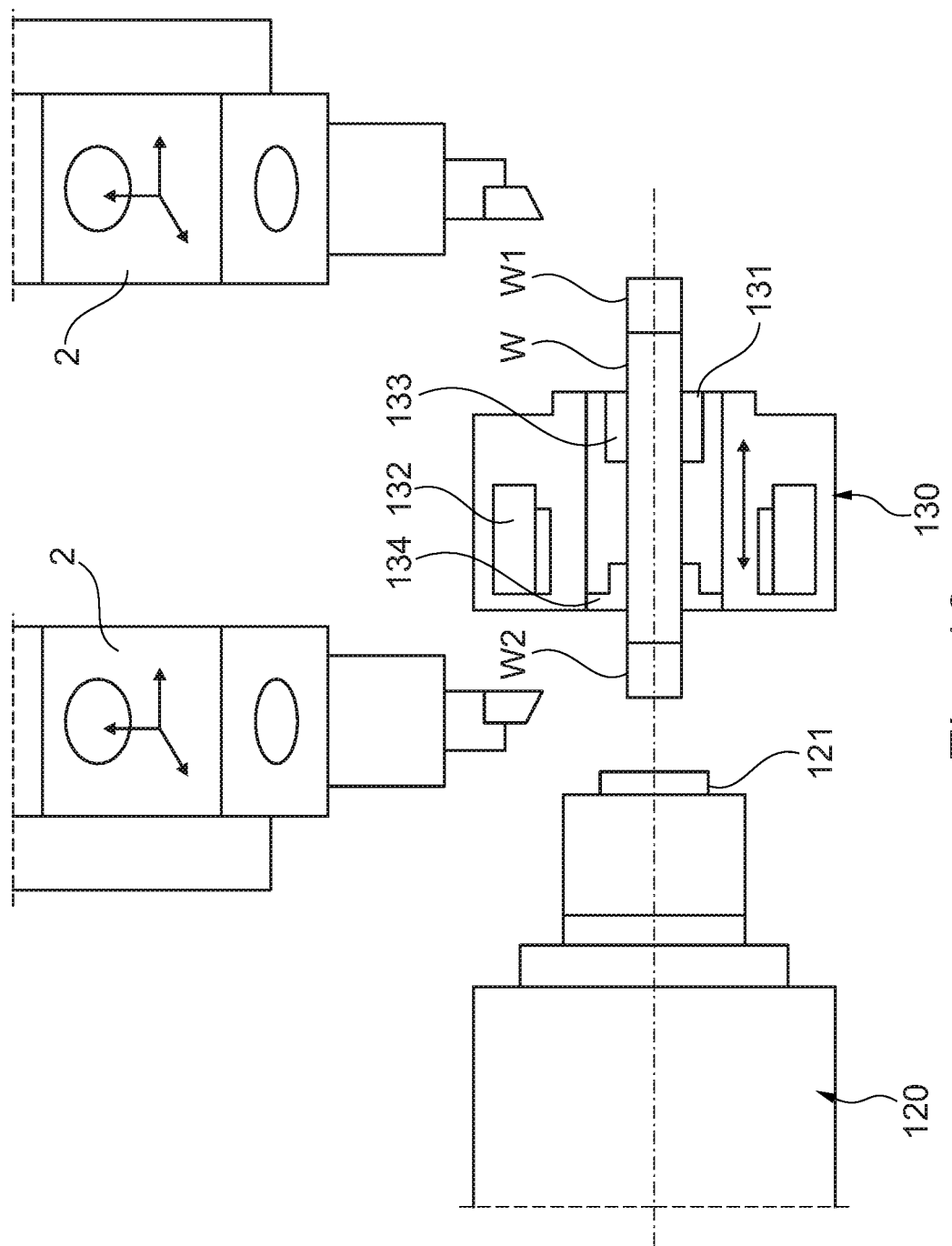
FIG. 10 exemplarily illustrates an abstract sectional view of a auxiliary hollow spindle according to exemplary embodiments.

FIG. 10 exemplarily illustrates an abstract sectional view of an auxiliary spindle carrier 130 according to exemplary embodiments. As previously mentioned, such auxiliary spindle carrier 130 can optionally be provided, for example, the optional auxiliary spindle carrier 130 can be slidably mounted to the front support portion 112 between the main spindle carrier 120 and the counter-spindle carrier 140, exemplarily guided horizontally on the guides 112a on the front support portion 112, i.e. exemplarily on the same guides 112a which support the counter spindle carried 130.

The optional auxiliary spindle carrier 130 includes (or at least supports) the auxiliary hollow spindle 131 being configured to receive an elongated workpiece, such as a bar, and support and/or guide a rotation of the received workpiece around the guide rotation axis of the auxiliary hollow spindle 131. The optional auxiliary hollow spindle 131 can be exemplarily arranged between the main spindle 121 and the counter spindle 141, on guides 12a, with its guide rotation axis extending in the horizontal direction coaxially arranged with respect to the spindle axes of the main spindle 121 and the counter spindle 141.

Accordingly, the auxiliary hollow spindle 131 can be moved horizontally in the range in between the main spindle 121 and the counter spindle 141 to receive the workpiece received in the main spindle 121 and to guide and/or support it, e.g. to prevent bending of the workpiece due to a force applied by the tool or to receive the workpiece received in the counter spindle 141 and to guide and/or support it, e.g. to prevent bending of the workpiece due to a force applied by the tool.

The auxiliary hollow spindle 131 exemplarily includes a controllable guide clamp unit 133, 134 to clamp a workpiece W such as a bar to guide a rotation of the workpiece W about the rotation axes of the spindles and the auxiliary hollow spindle 131. The guide clamp unit 133, 134 can be controlled by electric, hydraulic and/or pneumatic control, preferably to switch the guide clamp unit 133, 134 between three clamping states.

In one clamp state, a sleeve of the guide clamp unit 133, 134 can be loosened so that the workpiece W is in an unclamped state (loose state). In another clamp state, the sleeve of the guide clamp unit 133, 134 can be actuated to clamp the workpiece W in a first (weaker) clamp state in which the workpiece W is loosely clamped so as to not be able to transfer torque between the workpiece W and the guide clamp unit 133, 134 but to support and guide the workpiece W coaxially with the spindle axes, wherein a movement of the workpiece W in the direction parallel to the spindle axes remains possible. In another clamp state, the sleeve of the guide clamp unit 133, 134 can be actuated to clamp the workpiece W in a second (stronger) clamp state in which the workpiece W is strongly clamped so as to enable to transfer torque between the workpiece W and the guide clamp unit 133, 134 in addition to supporting and guiding the workpiece W coaxially with the spindle axes, wherein a movement of the workpiece W in the direction parallel to the spindle axes is not possible due to the strong clamping state.

In the latter state, i.e. in the stronger second clamp state, the workpiece W received in the auxiliary hollow spindle 131 can be rotationally driven by a direct drive 132 (exemplarily including an electric or electromagnetic motor). Accordingly, in such state, the auxiliary hollow spindle 131 is configured to be used as a through-hole additional spindle that gives the possibility to machine both workpiece ends W1 and W2 by different tool carriers in one clamping state, providing perfect coaxial arrangement; see e.g. FIG. 10. In other exemplary embodiments, the drive may be realized as a conventional drive mechanism, e.g. including a gear mechanism.

Figure 11:
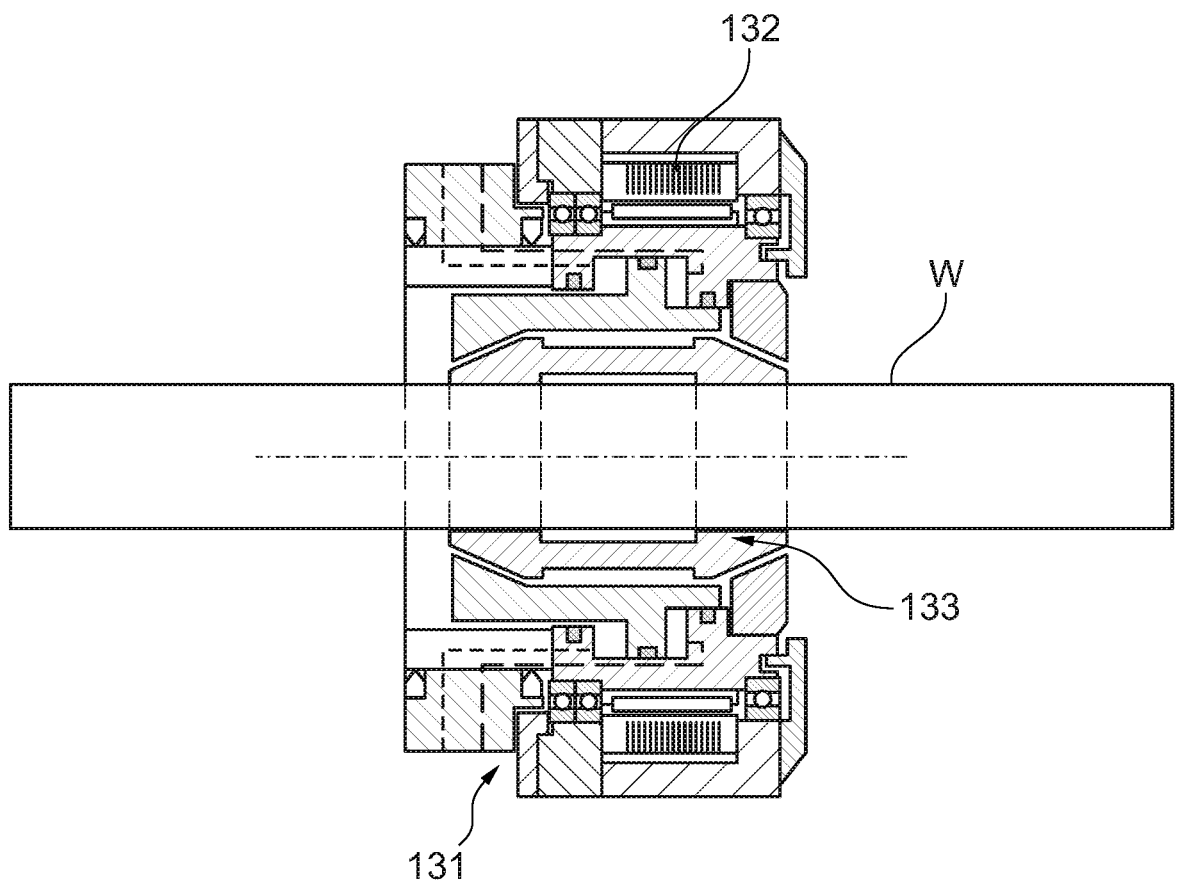
FIG. 11 exemplarily illustrates a sectional view of a auxiliary hollow spindle according to exemplary embodiments.

FIG. 11 exemplarily illustrates a sectional view of an auxiliary hollow spindle 131 according to exemplary embodiments. The auxiliary hollow spindle 131 includes the direct drive 132 arranged around the guide clamp unit including the sleeve 133 which can be electrically, hydraulically and/or pneumatically controlled to fixedly clamp the workpiece W coaxially with the spindle axes in the second clamping state, wherein both ends of the workpiece W extend out of the auxiliary hollow spindle 131 and are exposed for machining operations performed simultaneously on both side ends thereof (see also FIG. 10).

In addition to the above exemplary embodiments, further exemplary embodiments are conceivable.

For example, in other exemplary embodiments, the machine tool may further include the auxiliary spindle carrier being arranged on the upper or lower tool carrier portion of the machine frame, supporting the auxiliary hollow spindle being configured to receive and guide a workpiece coaxially with the spindle axis of the main spindle, in particular such that the workpiece extends out of the auxiliary hollow spindle on both sides of the auxiliary spindle carrier, in particular to enable machining of the workpiece clamped by the auxiliary hollow spindle without any release of the clamping state.

For example, the auxiliary spindle carrier can be configured to move along horizontal guides arranged on the upper or lower tool carrier portion of the machine frame in a horizontal direction in parallel with the spindle axis of the main spindle.

Also in such exemplary embodiments, the auxiliary spindle carrier can be arranged between the main spindle carrier and the counter spindle carrier.

Also in such exemplary embodiments, the auxiliary spindle carrier can support a spindle slide supporting the auxiliary hollow spindle for driving a movement of the auxiliary hollow spindle transverse or perpendicular with respect to the spindle axes.

In further exemplary embodiments, the machine tool may include two auxiliary hollow spindles, e.g. one being arranged opposed the main spindle and one being arranged opposed the counter spindle, preferably both auxiliary hollow spindles being arranged between the main and counter spindles.

For example, both auxiliary hollow spindles can be configured to move horizontally in the direction of the spindle axes, and the two auxiliary hollow spindles may each be arranged as discussed above for the case of one auxiliary hollow spindle.

Specifically, the auxiliary spindle carriers may both be arranged on the spindle carrier portion. Also, each of the auxiliary spindle carriers may be arranged on the spindle carrier portion, the upper and/or the lower tool carrier portion. In some exemplary aspects, one auxiliary spindle carrier may be arranged on the upper tool carrier portion and the other auxiliary spindle carrier may be arranged on the lower tool carrier portion. Furthermore, one or both of the auxiliary hollow spindles can be configured to also move in a direction transverse or perpendicular to the spindle axes.

In general, it is to be noted that workpieces can be loaded to the machine tool by a workpiece loading apparatus such as a bar loader, bar feeder, and/or a handling robot. Machined workpieces can be removed by an unloading apparatus, e.g. by a/the handling robot.

While certain exemplary aspects have been described above, it is to be understood that such aspects are merely illustrative of and are not restrictive on the broad invention, and that the exemplary aspects are not limited to the specific constructions and arrangements shown and described above, since various other changes, combinations, omissions, modifications and substitutions, in addition to those set forth in the above paragraphs, are possible. Those skilled in the art will appreciate that various adaptations, modifications, and/or combination of the just described aspects can be configured. Therefore, it is to be understood that, further aspects may be practiced other than as specifically described herein. Those skilled in the art will also appreciate, in view of this disclosure, that different aspects described herein may be combined to form other aspects of the present disclosure.

The invention claimed is:

1. Machine tool comprising:
a machine frame having an upper tool carrier support portion, a lower tool carrier support portion and a spindle carrier portion arranged between the upper and lower tool carrier support portions,
a spindle carrier, being arranged on the spindle carrier portion of the machine frame or at a height of the spindle carrier portion of the machine frame, supporting a main spindle configured to receive a workpiece, the main spindle having a horizontally arranged spindle axis,
one or more tool carriers, each tool carrier being supported on a tool carrier assembly being arranged on either the upper tool carrier support portion or the lower tool carrier support portion of the machine frame,
wherein
a lower side-surface of the lower tool carrier support portion, to which the one or more tool carriers are mountable, is inclined at an overhanging inclination angle with respect to a work floor on which the machine frame stands, such that the lower side-surface to which the one or more tool carriers are mountable faces towards the work floor.

2. Machine tool according to claim 1, wherein
the overhanging inclination angle is in the range between 300 and 330 degrees.

3. Machine tool according to claim 1, wherein
an upper side-surface of the upper tool carrier support portion, to which the one or more tool carriers are mountable, is arranged to have an inclination.

4. Machine tool according to claim 3, wherein
the upper side-surface of the upper tool carrier support portion is inclined at an inclination angle in the range between 30 and 60 degrees with respect to the work floor.

5. Machine tool according to claim 1, wherein
at least one tool carrier assembly of the one or more tool carriers is configured to independently move the respective tool carrier in one or more linear directions, including at least one of a Z-axis movement direction for moving the tool carrier horizontally in a direction in parallel to the spindle axis of the main spindle, an X-axis movement direction for moving the tool carrier radially with respect to the spindle axis of the main spindle, and a Y-axis movement direction for moving the tool carrier in a direction perpendicular to the spindle axis of the main spindle and perpendicular to the X-axis movement of the main spindle.

6. Machine tool according to claim 1, wherein
one or more or each tool carrier assembly is configured to rotate the respective tool carrier about a rotation axis which extends perpendicular to the spindle axis of the main spindle.

7. Machine tool according to claim 1, wherein
a counter-spindle carrier being arranged on the spindle carrier portion of the machine frame, supporting a counter spindle facing the main spindle and being configured to receive a workpiece, the counter spindle having a horizontally arranged spindle axis being arranged coaxially with the spindle axis of the main spindle.

8. Machine tool according to claim 7, wherein
the main spindle carrier and/or the counter-spindle carrier is configured to move along horizontal guides arranged on the spindle carrier portion of the machine frame in a horizontal direction in parallel with the spindle axes of the main and counter spindles.

9. Machine tool according to claim 7, wherein
the counter-spindle carrier supports a spindle slide supporting the counter spindle for driving a movement of the counter spindle transverse or perpendicular with respect to the spindle axes.

10. Machine tool according to claim 1, wherein
an auxiliary spindle carrier being arranged on the spindle carrier portion of the machine frame, supporting an auxiliary hollow spindle being configured to receive and guide a workpiece coaxially with the spindle axis of the main spindle, such that the workpiece extends out of the auxiliary hollow spindle on both sides of the auxiliary spindle carrier to enable machining of the workpiece clamped by the auxiliary hollow spindle without any release of the clamping state.

11. Machine tool according to claim 10, wherein
the auxiliary spindle carrier is configured to move along horizontal guides arranged on the spindle carrier portion of the machine frame in a horizontal direction in parallel with the spindle axis of the main spindle.

12. Machine tool according to claim 7, wherein
the auxiliary spindle carrier is arranged between the main spindle carrier and the counter spindle carrier.

13. Machine tool according to claim 10, wherein
the auxiliary hollow spindle includes an electrically, hydraulically and/or pneumatically controlled clamp unit to clamp the workpiece received in the auxiliary hollow spindle, and a drive to drive a rotational motion of the workpiece clamped by the clamp unit.

14. Machine tool according to claim 13, wherein
the drive includes an electric or electro-magnetic direct drive mechanism.

15. Machine tool according to claim 10, wherein
the auxiliary spindle carrier supports a spindle slide supporting the auxiliary hollow spindle for driving a movement of the auxiliary hollow spindle transverse or perpendicular with respect to the spindle axes.

\* \* \* \* \*